(12) United States Patent
Ries et al.

(10) Patent No.: US 9,946,652 B2
(45) Date of Patent: Apr. 17, 2018

(54) PRE-FETCH IN A MULTI-STAGE MEMORY MANAGEMENT SYSTEM

(71) Applicant: STMicroelectronics International N.V., Amsterdam (NL)

(72) Inventors: Gilles Ries, Saint-Jean De Moirans (FR); Ennio Salemi, Grenoble (FR); Sana Ben Alaya, Fontaine (FR)

(73) Assignee: STMicroelectronics International N.V., Schiphol (NL)

( * ) Notice: Subject to any disclaimer, the term of this patent is extended or adjusted under 35 U.S.C. 154(b) by 637 days.

(21) Appl. No.: 14/486,215

(22) Filed: Sep. 15, 2014

(65) Prior Publication Data

US 2015/0081983 A1 Mar. 19, 2015

(30) Foreign Application Priority Data

Sep. 16, 2013 (EP) .................................... 13368031

(51) Int. Cl.
*G06F 12/00* (2006.01)
*G06F 12/0862* (2016.01)
*G06F 12/1027* (2016.01)

(52) U.S. Cl.
CPC ...... *G06F 12/0862* (2013.01); *G06F 12/1027* (2013.01); *G06F 2212/602* (2013.01); *G06F 2212/654* (2013.01)

(58) Field of Classification Search
CPC ......... G06F 12/0246; G06F 2212/7202; G06F 2212/7201; G06F 12/1027; G06F 2212/654
USPC ................................................. 711/105, 207
See application file for complete search history.

(56) References Cited

U.S. PATENT DOCUMENTS

| | | | | |
|---|---|---|---|---|
| 5,696,926 A | * | 12/1997 | Culbert | ................. G06F 12/023 711/105 |
| 2008/0229118 A1 | * | 9/2008 | Kasako | ................... G06F 21/80 713/193 |
| 2009/0292899 A1 | * | 11/2009 | Mansell | ............. G06F 12/1009 711/207 |
| 2012/0226888 A1 | * | 9/2012 | Rychlik | ............. G06F 12/1027 711/207 |

FOREIGN PATENT DOCUMENTS

WO WO-2012119148 A1 9/2012

OTHER PUBLICATIONS

EPO Search Report and Written Opinion for EP13368031.4 dated Feb. 19, 2014 (7 pages).

* cited by examiner

*Primary Examiner* — Mardochee Chery
(74) *Attorney, Agent, or Firm* — Gardere Wynne Sewell LLP

(57) ABSTRACT

A memory management system for managing a memory and includes a multi-stage memory management unit including control circuitry and cache memory. The cache memory may have a respective translation look-aside buffer for each stage of the multi-stage memory management unit. The control circuitry may be configured to generate a blank data request including a virtual address and information that specifies that data is not to be read from the memory, perform address translations based on the generated blank data request in multiple stages until a physical address is obtained, and discard the blank data request.

18 Claims, 4 Drawing Sheets

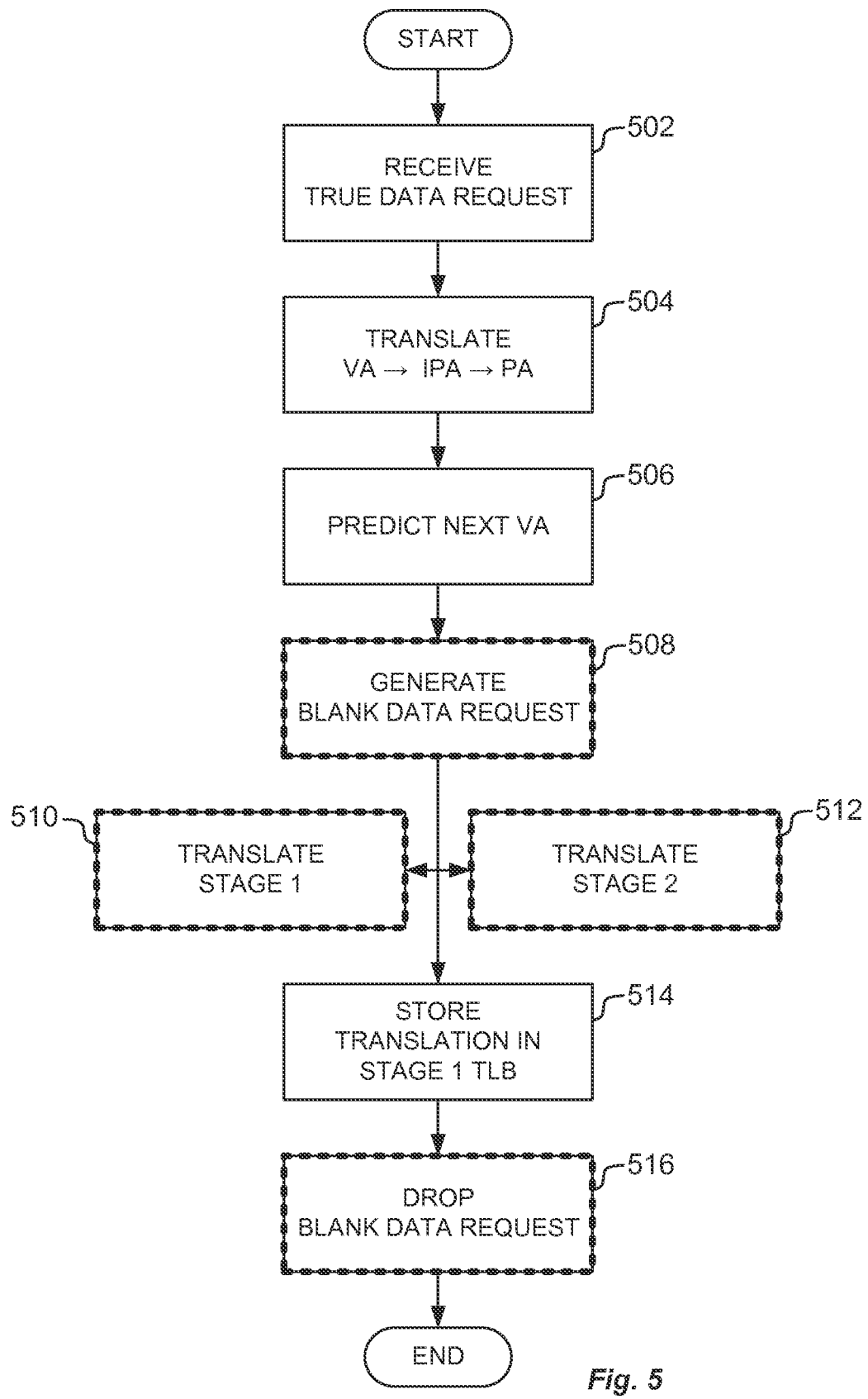

//<br>
PRE-FETCH IN A MULTI-STAGE MEMORY MANAGEMENT SYSTEM

RELATED APPLICATION

This application claims the benefit of European Application No. 13368031.4, filed Sep. 16, 2013, entitled "PRE-FETCH MECHANISM FOR MULTI-STAGE MMU", the contents of which are incorporated by reference to the maximum extent allowable under law.

TECHNICAL FIELD

The field of the present disclosure is that of controlling a memory management system where virtual addresses are translated into physical addresses.

BACKGROUND

A complex operating system, OS, that runs on a central processing unit, CPU, may perform memory allocation from a central memory unit, which may be in the form of dynamic random access memory, DRAM. As times goes on after an OS has booted, the memory may become more and more fragmented, to a point where the OS may have difficulties or even be unable to allocate large contiguous memory buffers, despite the fact that there is enough available memory.

There have been attempts at correcting this memory fragmentation. For some time, memory management units, MMUs, have been implemented that allow an address translation from a virtual address, VA, space that is contiguous to a physical address, PA, space that is fragmented. The VA seen by the CPU is contiguous in the virtual address space, while the PA in the physical memory is fragmented. The process of translating from one domain, e.g. the VA domain, to another domain, e.g. the PA domain, with a direct translation is called an MMU-Stage.

Because of virtualization desires, a double address translation, i.e. a two-stage translation, may be used. There is a first stage translation that translates from the CPU-running VA, to a first address space, the intermediate physical address space, IPA, which may be fragmented. A second stage translation that translates from the IPA to the final PA, which also is fragmented as discussed above, may then be performed. For example, in a personal computer, the VA may be used by the local subsystems, such as the display, the graphic card, etc., while the IPA may be used by an OS. In case the PC is to run multiple operating systems, each OS might see their own IPA, while the PA may be the data truly stored data in the physical DRAM chips.

The rationale for using a two-stage address translation is that the OS on the CPU directly controls its own MMU, the first stage, and assumes that the IPA is the final address, while virtualization software controls the second stage of the MMU. An evolved system could contain several, i.e. more than two, consecutive OS virtualization levels, with multiple consecutive stages of MMUs.

FIG. 1 illustrates schematically, in terms of functional blocks, a two-stage MMU. A first stage 104 translates from the VA, as seen/used/generated by a CPU or any hardware, HW, subsystem 102 into the IPA. A second stage 106 translates from the created IPA to the final PA that makes the true lookup into the physical memory 108.

In a certain implementation, each of the two stages 104, 106 is divided into three translation levels. At each level, a lookup is performed in a table to which a requested VA address may be redirected in the next domain (i.e. the next domain being PA for a single-stage system and the next domain being IPA for a double-stage system). The first level translates the most significant bits, MSB, of the input address (i.e. the VA for first stage and the IPA for the second stage). These bits are used in a lookup operation in a page table that resides in the DRAM, whereby a translation is obtained for the MSB. In the second level a translation is made of the middle bits of the input address. The result of the previous lookup (i.e. Level-1) is used to look up in the DRAM table where its middle bits may get data from. In the third level, the least significant bits, LSB, of the input address are translated.

The page table may be large and sometimes may not be stored locally in the MMU, but in main memory (i.e. DRAM), so that a local MMU cache is used. Such an MMU cache may be called a translation look aside buffer, TLB. Accessing the TLB may result in a miss, i.e. the desired address is not present in the TLB, with an associated cost in delaying the address translation. The TLB, being a cache, is to be refilled with address translation information, i.e. a process denoted TLB refill. In a two-stage MMU, the TLB refill (the translation information of the first stage) is requested as a default IPA request, so that it is processed by the second stage as a default IPA data, translated to PA.

Present day MMUs that are provided and implemented for complex systems with two or more stages of address translation may be constructed as consecutive concatenations of single-stage MMUs. In such MMUs, each time a requestor (CPU or any other HW subsystem) asks for data to the MMU, the MMU may perform a TLB lookup to search for the VA, in order to provide the address translation value. Each time the lookup is absent from the TLB (i.e. there is a TLB miss), the MMU may fetch that address translation information from the main memory, i.e. DRAM. Such an address translation fetch involves expenditure of some time to get the translation data back, which is a delay during which the initial request (by the CPU or other HW) is blocked in the MMU. Such a delay is a delay during which the CPU or other HW subsystem typically remains idle.

In order to avoid the CPU or other HW having to remain idle for a long period of time, a present day MMU may try to guess the next requested VA and pre-fetch from memory the translation information for this guessed next requested VA. In some cases, this is may be efficient. For instance, in the case of multimedia HW systems such as video HW decoders, camera sensors and display subsystems may create VA requests at periodic addresses that are thus highly predictable.

The MMU pre-fetch mechanism can thus fairly easily predict the address of a next (and later) request, and may perform a pre-fetch in DRAM of the data used to translate that predicted request. When the actual request arrives, the translation data may be already present in the TLB, resulting in that the translation can occur immediately without delay.

However, yet further improvements in MMUs are desired.

SUMMARY

In an embodiment, there is provided in a first aspect a memory management system that may include a multi-stage memory management unit, MMU that has control circuitry and cache memory. Each MMU stage may be associated with a respective translation look-aside buffer, TLB, in the cache memory, and the MMU may be configured to process data requests associated with virtual addresses, VA, from data request initiators. The MMU may also be configured to translate the virtual addresses into physical addresses, PA, in memory. The control circuitry in the MMU may be configured to generate a blank data request comprising a virtual address and information that specifies that no data is to be used from the memory, perform address translations based on the generated blank data request in multiple stages until a physical address is obtained, and discard the blank data request.

In other words, the pre-fetch mechanism located in each MMU stage may be replaced by a "global" pre-fetch. This may be achieved by generating a blank data request and inserting this data request at the entrance of the first stage, letting this data request ripple through the stages of the MMU as a normal data request with its TLB refills, and discarding the data request when quitting the last stage of the MMU. The blank data request may include a virtual address and information that specifies that no data is to be read from the memory (in contrast to a true, non-blank, data request that specifies an amount of data that is to be read). The virtual address of the blank data request can be an address that is predicted (calculated) based on a preceding virtual address.

By this, the stages of the MMU may be correctly stimulated in that the predicted VA address of the blank data request provokes a fetch of translation data in the stages and in (sub) levels of each stage of the MMU, so that when a true data request (i.e. a data request that is non-blank and thereby is intended to obtain data for a requesting entity) is received, it may find its translation data already fetched and present in the TLB's.

The blank data request may result in filing the TLB's with address translation data as if a true data request had been done. However, no data is fetched from the memory, since the data request may be blank so that the data access (at PA) is not truly performed but is discarded.

An overall advantage of this is that it may minimize the undesired and potentially unavoidable TLB misses and delays that are associated with prior art configurations of MMU systems.

In a second aspect there is a method of managing memory in a memory management system. The memory management system may include a multi-stage memory management unit, that includes control circuitry and cache memory, wherein each stage is associated with a respective translation look-aside buffer in the cache memory. The memory management unit may be configured to process data requests associated with virtual addresses from data request initiators, and configured to translate the virtual addresses into physical addresses in memory. The memory may include generating a blank data request having a virtual address and information that specifies that no data is to be read from the memory, performing address translations based on the generated blank data request in multiple stages until a physical address is obtained, and discarding the blank data request.

The effects and advantages of the method of the second aspect correspond to those of the apparatus of the first aspect.

BRIEF DESCRIPTION OF THE DRAWINGS

FIG. 5 is a flow chart of a method performed in a two-stage memory management unit.

DETAILED DESCRIPTION

Figure 1:
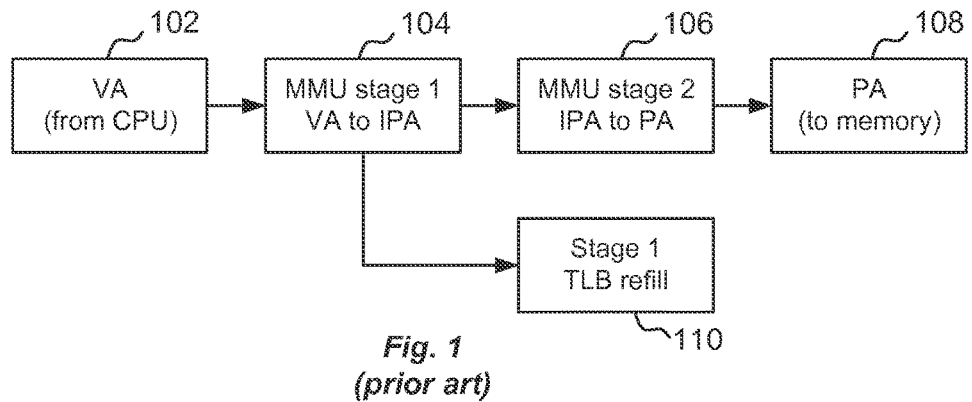
FIG. 1 is a schematically illustrated block diagram of functions performed in a memory management unit.
Figure 2:
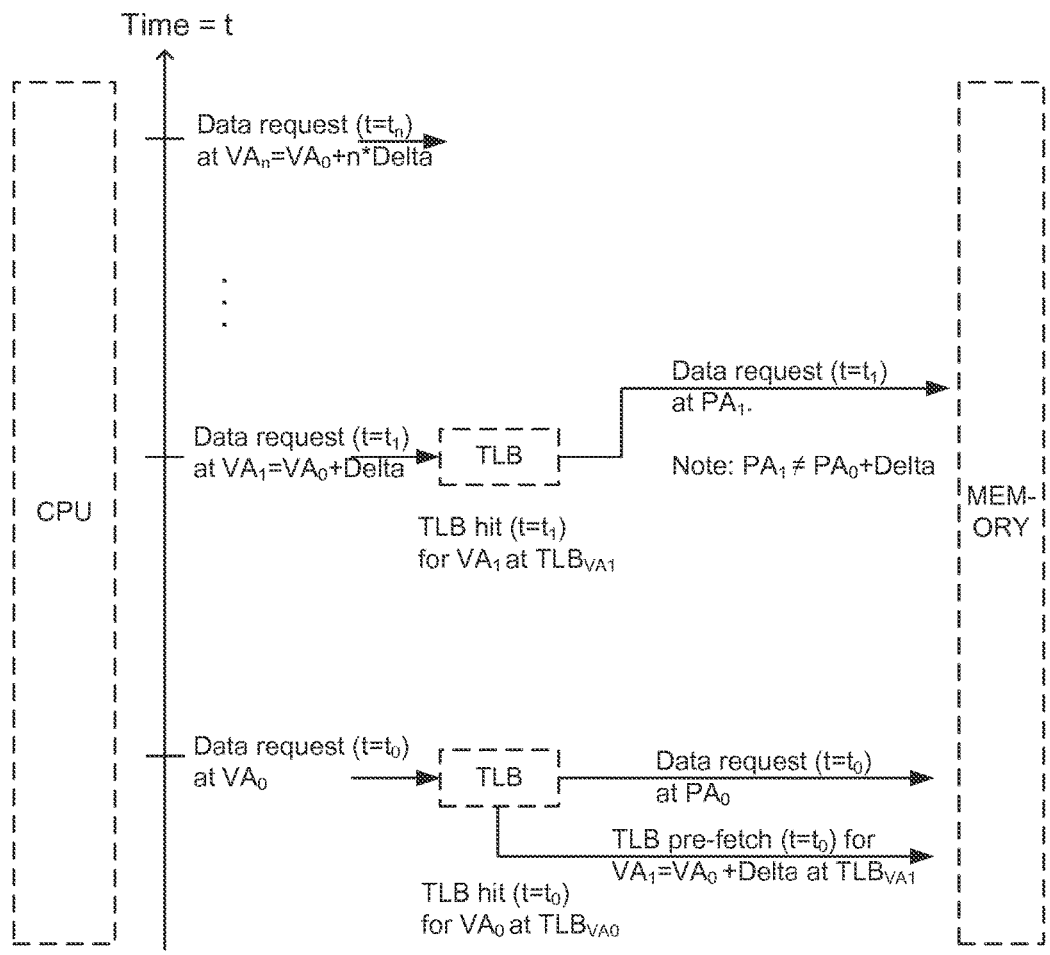
FIG. 2 is a schematically illustrated diagram of address translation functions performed in a single-stage memory management unit.

FIG. 2 shows an implementation of a single-stage MMU with a first data request at $VA_0$ that results a TLB hit (thanks to a previous prefetch). The access to VA0 induces a TLB prefetch for $VA1=VA_0+Delta$, with delta being the guessed difference between the first requested address and the presumed address of the subsequent request.

The delta value is expected to be known by the system, and configured as such in the MMU. For example, a HW that reads a buffer in raster may predict that after reading a first MMU page of 4 kByte, the next page may be at address +4 kByte (i.e. the next page). In some cases, the raster buffer may be read along a vertical strip. In that case, after reading a few pixels from one line, the next pixels to be read are located in the next line. The address predicted here is not the next 4 kB page, but may be a bit later: e.g. a 4096 pixel-wide buffer, with a 4 byte/pixel storage, has its next line starting at address 4096×4=16384, thus 4 pages of 4 kByte after the first line: the MMU may be programmed to jump by steps of +16 kB and not +4 kB.

A second data request may be made later at $VA_1$, which hits the above pre-fetched $VA_0+Delta$ address (and hence a low latency to return the VA1 data) and which induces a further TLB pre-fetch for the next $VA2=VA_1+Delta$, and so on with permanent hits, as long as the next request occurs at a value Delta further on.

The pre-fetch mechanism shown in FIG. 2, when applied to a single-stage MMU works fairly well, mostly thanks to the fact that buffers addressed are contiguous and that accesses (by multimedia subsystem) to these contiguous buffers are typically periodic, so that a next VA address is at delta after the preceding one. For example, the pixel buffers that are accessed by the CPU (virtual address) are seen by the CPU as fully contiguous, unlike in IPA or PA, where the buffers are fragmented.

However, in case of multi-stage MMU, the first stage gets the periodic request from the multimedia subsystem: the later stage(s) of the MMU get requests generated by the previous stage(s). Because of the fragmentation of the IPA, the addresses quitting the first stage and entering the second stage are fully random (if the buffer is fully fragmented), and can fall anywhere in the footprint of the addressable IPA memory. In other words, data buffers accessed by the CPU are contiguous in VA, fragmented in IPA, and even more fragmented in PA. Hence, it may be difficult to predict the next IPA address based on the current IPA address.

Figure 3:
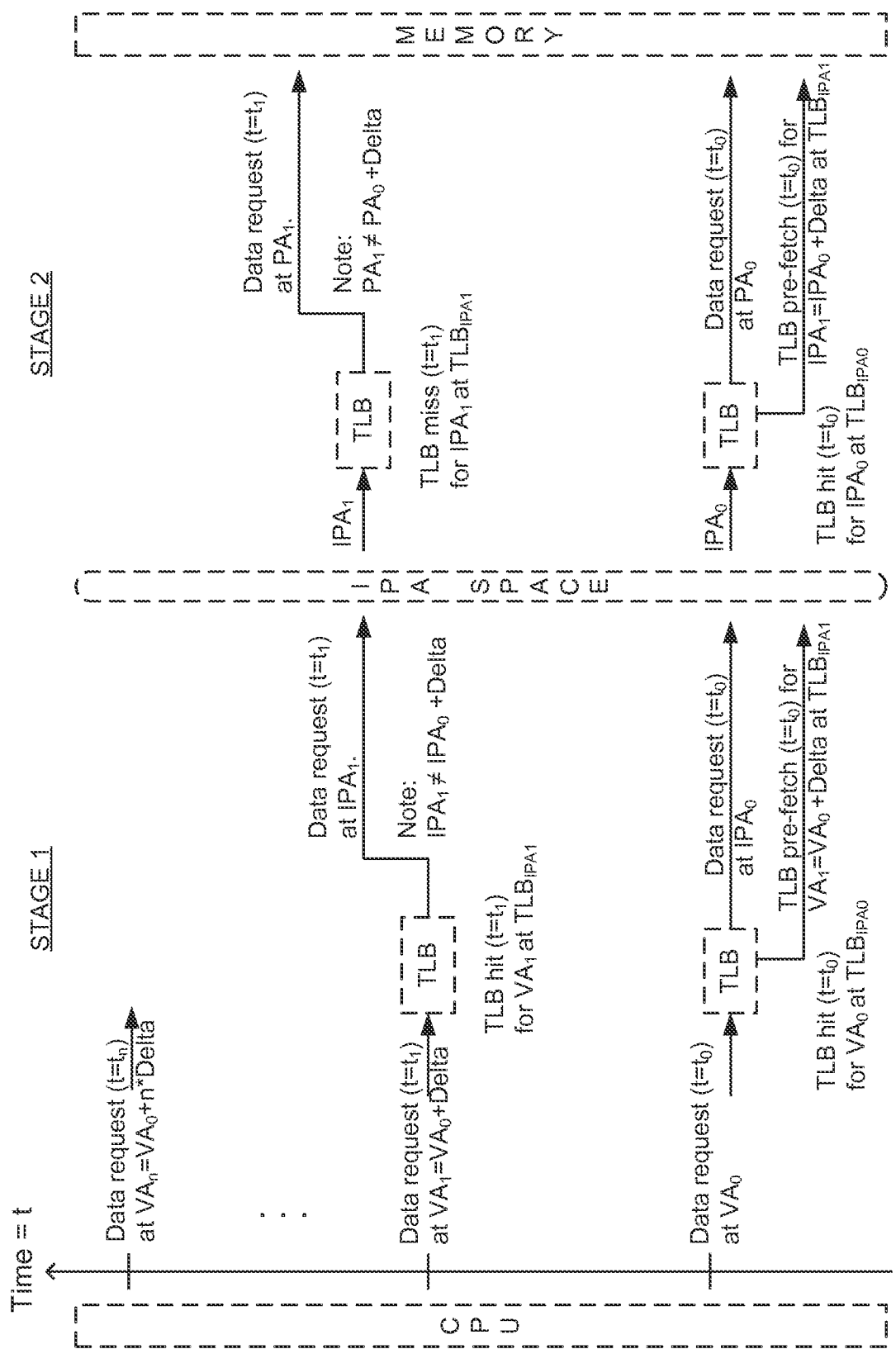
FIG. 3 is a schematically illustrated diagram of address translation functions performed in a two-stage memory management unit.

FIG. 3 illustrates this problematic issue, where $VA_1$ comes truly at the delta after $VA_0$. However, the translated $IPA_1$ is not equal to $IPA_0+Delta$. A consequence of this is that, when the second stage tries a pre-fetch at address $IPA_0+Delta$, it may be a useless move because the next request may occur at $IPA_1$, which is different than $IPA_0+Delta$:

Hence, it may be a wasted effort for the MMU to both pre-fetch the wrong $IPA_0+Delta$ and to cache it. However, even more importantly, later at t=t1, the data request at VA1 may create a TLB miss for IPA1 (at the true IPA1 will be missing), which may result in fetches to create the IPA1 translation, and hence added latencies for the CPU to get returned its VA1 data.

Figure 4:
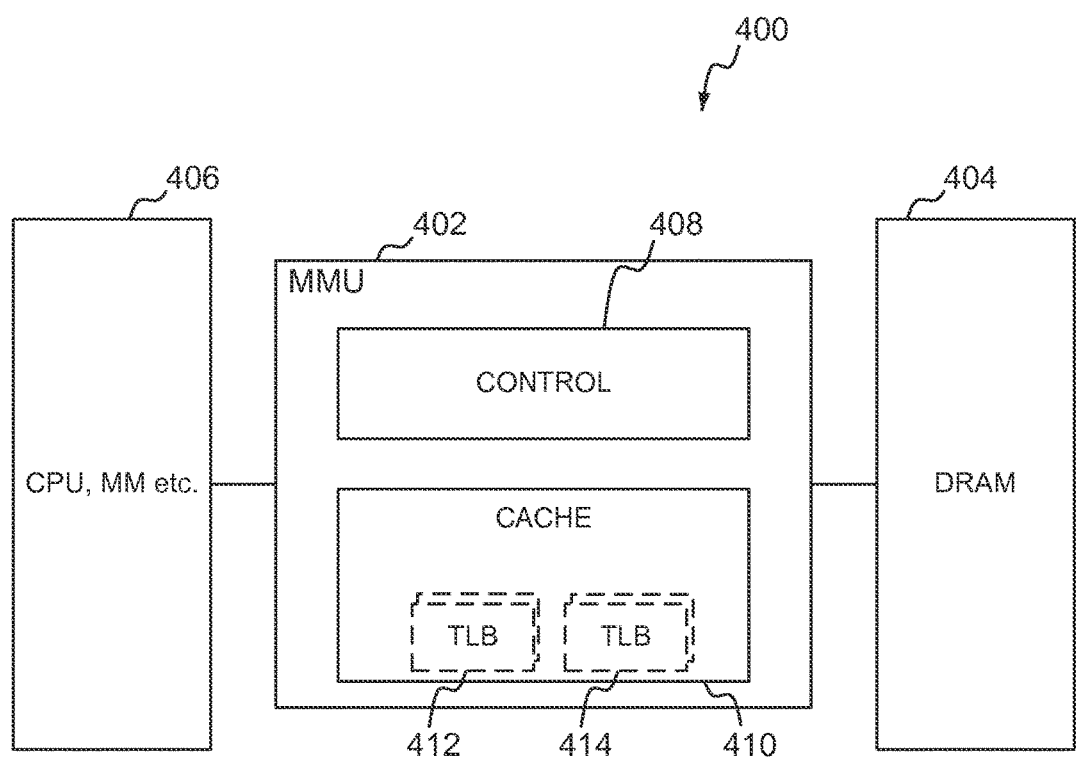
FIG. 4 is a block diagram that schematically illustrates a memory management unit device.

FIG. 4 illustrates a memory management unit MMU 402 coupled to a main memory 404, which can be of any suitable type such as DRAM, and coupled to an entity 406 capable of performing data requests, such as a CPU or a multimedia, MM, subsystem. The MMU 402 includes control circuitry 408 and internal cache memory 410. The internal cache memory 410 is configured with a number of translation look aside buffers TLB's, of which a first stage TLB 412 and a second stage TLB 414 are shown. As the skilled person will realize, the MMU 402, the memory 404 and the data requesting entity 406 may form part of a larger system such as a computer or a communication device, or any other digital apparatus that is configured to execute software that involves data requests involving a virtual memory domain and a physical memory domain.

FIG. 5 is a flow diagram of actions performed in a method that is performed in a two stage MMU such as the MMU 402 in FIG. 4. As the skilled person will realize, the MMU is a hardware entity that is configured with circuitry that operates to handle data requests in a system as illustrated in FIG. 4. It is to be noted that FIG. 5 is merely a convenient way in which to illustrate the actions performed by control and cache memory circuitry in a MMU, such as the control circuitry 408 and the cache memory 410 in the MMU 402 in FIG. 4. The actual circuitry configuration of a MMU that is configured to perform the actions of FIG. 5 can be realized, by referring to the present disclosure, in hardware in an appropriate manner by the skilled person.

In FIG. 5, actions 508, 510, 512 and 516 are highlighted. These highlighted actions exemplify the general aspect of the memory management of this disclosure. That is, a method that comprises these actions, or steps, and an arrangement in the form of a memory management system that is configured to perform these actions.

Turning now to the flow chart of FIG. 5, in a reception action 502, the first stage receives a true data request (comprising a virtual address and information about an amount of requested data) from a requesting entity at virtual address $VA_0$, and performs this request by translating, in a translation action 504, via an intermediate physical address $IPA_0$, $VA_0$-to-$IPA_0$, then translating the intermediate physical address to a physical address $PA_0$, $IPA_0$-to-$PA_0$, and then fetching the requested data from DRAM at the $PA_0$ address.

In a prediction action 506, the first stage then calculates a prediction, based on the true data request of action 502 (i.e. the virtual address of the true data request), the VA of a next data request. This calculation generates a predicted delta value. The actual algorithm for performing the calculation of the delta value can be selected among a number of different alternatives. For example, the delta can be provided by a configuration, based on elements known by the user. A good example is pixels accessed vertically from a 2D buffer—the distance between 2 accessed pixels equals the line length. As another example, the delta can be extracted without configuration, by more complex methods not disclosed here.

In a generating action 508, the first stage then generates, after the prediction action 506 and using the predicted delta value, a blank data request at address $VA_1=VA_0+$delta. As explained above, a blank data request is a request that includes a virtual address and information that specifies that no data is to be read from the memory.

The prediction of the delta value in the prediction action may often be correct, with very high rates for multimedia buffers and sequential accesses, typically more than 99%. For instance, in case of an 2D HD Buffer (1920×1080 pixels), the prediction is correct for 1079 cases out of 1080. However, if the prediction is not correct, a bad predicted access fills the MMU tables with useless (i.e. incorrect) translation data, with the consequence that when a true (poorly predicted) data request arrives, such a request may face very long latencies to get translated, and may create idle times in the requesting entity, e.g. the CPU.

In translation actions 510 and 512, the first stage and the second stage of the MMU operate together to translate the blank request as follows. Assuming the TLB misses (which is usually the case due to fragmentation), the next steps are performed. Thus, the first stage is triggered by the blank data request to lookup translation data in its level 1, level 2 and level 3 caches. If the translation data is not present in the first stage cache (i.e. the TLB of the first stage), the first stage may fetch the translation-data as defined/pointed-to by the first stage in the IPA space: S1L1-IPA, S1L2-IPA, S1L3-IPA.

The second stage of the MMU fully processes these S1L1-IPA, S1L2-IPA, S1L3-IPA data requests. For S1L1-IPA, it may translate from IPA to PA the S1L1-IPA address as the translation is done in three levels (S2L1, S2L2, S2L3). In case of translation data misses, it may result in translation data fetch from memory to the S2L1-PA, S2L2-PA, S2L3-PA. Then, as the initial S1L1-IPA is translated into a S1L1-VA, a final fourth access may be done to memory to fetch the S1L1 data itself, which is returned to the Stage-1 MMU.

The same operations are done for the S1L2 and S1L3 data requests, which both result in four accesses to the memory. The Stage-1 MMU, thanks to the returned S1L1, S1L2, S1L3 translation data, is now able to translate the predicted VA1 into a predicted IPA1. A blank request for IPA1 is then forwarded from Stage-1 to the Stage-2 MMU.

The Stage-2 MMU translates the IPA1 blank request to PA1. As for the above-described S1L1 IPA-to-VA translation, the translation is done in three levels and uses (in the case of probable misses) three accesses to the memory.

The Stage-2 MMU now has available the PA address of the predicted VA1. As the data request is flagged as blank, the PA1 access is not performed to memory but is simply discarded.

From a general stand-point, the MMU caches are now containing the full translation chain of the VA1 address, as shown in FIG. 5 as 514 and 514 bis. (note: add that 514bis for the Stage2). The data stored as 514 and 514bis have performed fifteen data-dependant accesses to memory.

When the true VA1 address comes, later, at t=t1, and if VA1 has been correctly predicted, the data access to PA1 is to be performed, and not the fifteen above accesses (for translation needs) followed by the data access itself, thus reducing from sixteen to one the consecutive accesses, thus latencies.

From the general viewpoint of the MMU, the translation data is returned, after some latency, to the first stage. The first stage then stores, in a storage action 514, the returned translation data in its internal caches, i.e. the first stage TLB. The MMU is then controlled, in a drop action 516, to drop the blank data request that was generated in the generating action 508.

As a consequence of these actions, when the predicted request from the requesting entity, e.g. CPU or multimedia subsystem, arrives with the correctly predicted virtual address at $VA_1$, the first stage may have its TLB filled with the $VA_1$-to-$IPA_1$ translation. The $VA_1$ is translated immediately to $IPA_1$, and forwarded to the second stage. The second stage may have its TLB filled with the $IPA_1$-to-$PA_1$ information and the $IPA_1$ is translated immediately to $PA_1$, and forwarded to the memory (if, as in the present example, the MMU has two stages), with the effect that the $VA_1$ request is immediately translated without latency.

This is in contrast to a case where a double stage MMU is addressed without pre-fetch. In such a case, the fifteen accesses done above in a pre-fetch phase, are done after reception of the true data request, thus when time is running.

The modern MMU now process the translation information in three levels per stage, with one lookup per level, and thus has three levels per stage. Then, assuming the notation that DL is the default delay to fetch data in memory, the above cost in latencies are modified, with first and second memory access resulting in three memory accesses each (i.e. one per level), while the third memory access remains with a cost of a single DL. That is:

For no Pre-fetch at all, there may be a total of sixteen DL:
a. S1L1 translation data: 4 DL
b. 3 DL for the S1L1, S2L2, S2L3 IPA-to-PA translations
c. 1 DL for the fetched VA-to-IPA translation data
d. S1L2 translation data: 4 DL (similar to above)
e. S1L3 translation data: 4 DL (similar to above)
f. S2 translation data: 3 DL (S2L1, S2L2, S2L3)
g. data itself: 1 DL For a per-stage pre-fetch, there may be a total of one DL:
a. S1L1 translation data: 0 DL as prefetched.
b. S1L2 translation data: 0 DL as prefetched.
c. S1L3 translation data: 0 DL as prefetched.
d. S2 translation data: 3 DL (S2L1, S2L2, S2L3)
e. data itself: 1 DL For a pre-fetch as described herein, there may be a total of 1 DL:
a. S1L1 translation data: 0 DL as prefetched.
b. S1L2 translation data: 0 DL as prefetched.
c. S1L3 translation data: 0 DL as prefetched.
d. S2 translation data: 0 DL as prefetched by blank access
e. data itself: 1 DL This illustrates that the embodiments of the method and arrangements disclosed herein may divide by a factor of four the time used to get data back from memory.

What is claimed is:

1. A memory management system for managing a memory, comprising:
   a multi-stage memory management unit comprising control circuitry and cache memory;
   the cache memory comprising a respective translation look-aside buffer for each stage of the multi-stage memory management unit;
   wherein the control circuitry is configured to:
      generate a blank data request comprising a virtual address and information that specifies that data is not to be read from the memory,
      perform address translations based on the generated blank data request in multiple stages until a physical address is obtained, and
      discard the blank data request.

2. The memory management system of claim 1, wherein the control circuitry is also configured to generate the blank data request in response to reception of a true data request comprising a virtual address and information that specifies that data is to be read from the memory.

3. The memory management system of claim 2, wherein the control circuitry is also configured to generate the blank data request such that the virtual address of the blank data request is a prediction based on the virtual address of the received true data request.

4. The memory management system of claim 1, wherein the multi-stage memory management unit comprises a two-stage memory management unit configured to translate the virtual address into an intermediate physical address, and to translate the intermediate physical addresses into the physical address.

5. The memory management system of claim 1, wherein the multi-stage memory unit comprises a two-stage memory unit; and wherein the control circuitry is configured to:
   receive a true data request comprising a virtual address and information about an amount of requested data,
   translate the virtual address via an intermediate physical address to a physical address in the memory,
   calculate, based on the virtual address, a prediction of a virtual address of a next data request,
   generate the blank data request, the blank data request comprising the calculated prediction of the virtual address of the next data request,
   translate the blank data request by translating the virtual address of the next data address to an intermediate physical address of the next data addresses, and translating the intermediate physical address of the next data address to the physical address of the next data address,
   store the intermediate physical address of the next data address and the physical address of the next data request, and
   discard the blank data request.

6. The memory management system of claim 5, wherein the two-stage memory management unit comprises first and second stages that operate together to translate the blank request.

7. The memory management system of claim 6, wherein the first stage is triggered by the blank data request to look up translation data in the cache memory, and fetch translation data pointed to by the intermediate physical address based upon the translation data not being present in the cache memory.

8. The memory management system of claim 7, wherein the second stage is configured to fully process the true data request.

9. An article, comprising:
   a memory;
   a memory management unit for managing the memory and comprising:
   control circuitry configured to:
   generate a blank data request comprising a virtual address and information that specifies that data is not to be read from the memory, and
   perform address translations based on the generated blank data request until a physical address is obtained.

10. The article of claim 9, wherein the control circuitry is also configured to generate the blank data request in response to reception of a true data request comprising a virtual address and information that specifies that data is to be read from the memory.

11. The article of claim 10, wherein the control circuitry is also configured to generate the blank data request such that the virtual address of the blank data request is a prediction based on the virtual address of the received true data request.

12. The article of claim 9, wherein the control circuitry is configured to:
   receive a true data request comprising a virtual address and information about an amount of requested data,
   translate the virtual address via an intermediate physical address to a physical address in the memory,
   calculate, based on the virtual address, a prediction of a virtual address of a next data request, generate the blank data request, the blank data request comprising the calculated prediction of the virtual address of the next data request, process the blank data request by translating the virtual address of the next data address to an intermediate physical address of the next data addresses, and translating the intermediate physical address of the next data address to the physical address of the next data address, and store the intermediate physical address of the next data address and the physical address of the next data request.

13. The article of claim 12, wherein the memory management unit comprises first and second stages that operate together to translate the blank request.

14. The article of claim 13, wherein the memory management unit comprises a cache memory associated with the control circuitry; and wherein the first stage is triggered by the blank data request to look up translation data in the cache memory, and fetch translation data pointed to by the intermediate physical address based upon the translation data not being present in the cache memory.

15. A method for operating a memory management system, comprising:
- generating a blank data request comprising a virtual address and information that specifies that no data is to be read from a memory, using control circuitry;
- performing address translations, based on the generated blank data request, in multiple stages until a physical address is obtained, using the control circuitry; and
- discarding the blank data request, using the control circuitry.

16. The method of claim 15, wherein the blank data request is generated by the control circuitry in response to reception of a true data request comprising a virtual address and information that specifies that data is required from the memory.

17. The method of claim 16, wherein the blank data requested is generated by the control circuitry such that the virtual address of the blank data request is a prediction based on the virtual address of the received true data request.

18. The method of claim 15, further comprising:
- receiving a true data request comprising a virtual address, and information about an amount of requested data, using the control circuitry;
- translating the virtual address, via an intermediate physical address, to a physical address in the memory, using the control circuitry;
- calculating, based on the virtual address, a prediction of a virtual address of a next data request, using the control circuitry;
- generating the blank data request, using the control circuitry, with the blank data request comprising the calculated prediction of the virtual address of the next data request;
- translating the virtual address of the next data request to an intermediate physical address of the next data request, and translating the intermediate physical address of the next data request to a physical address of the next data request;
- storing the intermediate physical address of the next data request and the physical address of the next data request; and
- discarding the blank data.

* * * * *